April 8, 1924.
J. ROBERTS
SAFETY HOOK
Filed April 2, 1923
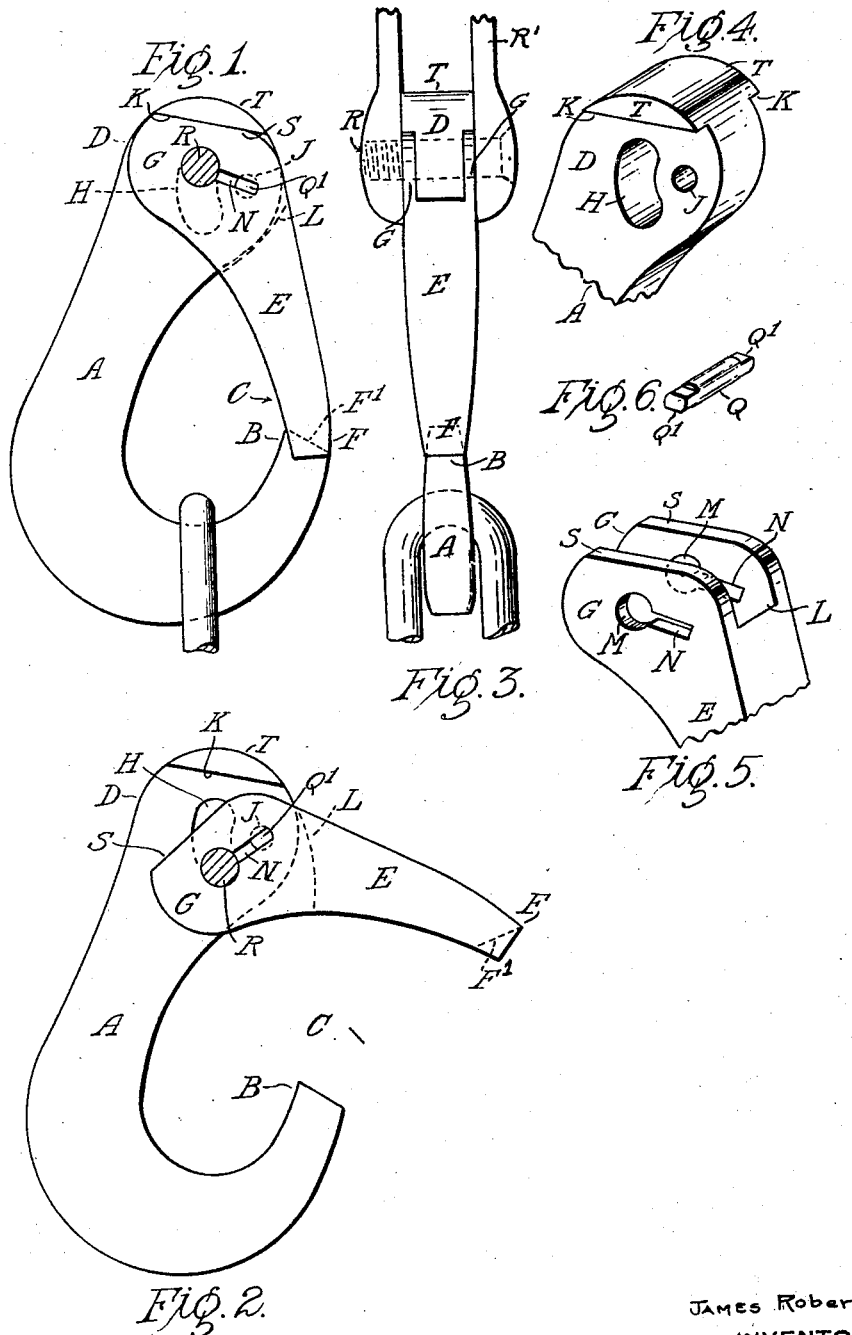
JAMES Roberts
INVENTOR;
By *Otto Munk*
his Attorney.

Patented Apr. 8, 1924.

1,489,509

UNITED STATES PATENT OFFICE.

JAMES ROBERTS, OF YARRAVILLE, VICTORIA, AUSTRALIA.

SAFETY HOOK.

Application filed April 2, 1923. Serial No. 629,275.

*To all whom it may concern:*

Be it known that I, JAMES ROBERTS, a subject of the King of Great Britain and Ireland, residing at 22 Stephen Street, Yarraville, in the State of Victoria, Commonwealth of Australia, have invented certain new and useful Improvements in Safety Hooks; and I do hereby declare the following to be a full, clear, and exact description of the invention, such as will enable others skilled in the art to which it appertains to make and use the same.

This invention relates to an improved supporting member, herein called a hook, for shifting cargo, and for general purposes. The hook has a movable member, herein called a safety lip or guard, which, when there is a load on the hook, will be automatically held closed, firmly shutting the hook mouth. The greater the tension on the hook the greater will be the resistance of the guard to opening. Hence the greater the weight, the greater the safety, so long as the strength of the hook is not overtaxed.

When there is no weight or pull on the hook the guard will not strongly resist being swung open, clear of the hook mouth. Each hook will be of any desired material, pattern, and size according to the purposes for which it is to be principally used, and will be suspended or supported by any suitable device on a shackle pin, the shackle being at the base of a rope, cable, or chain, for example. The hook guard closes automatically when the chain is drawn upwards to put tension on the hook; and, in circumstances hereinafter explained, in order that loading and unloading may be facilitated the hook guard will open automatically. The hook guard is substantially a pivoted lever, to either limb of which power is applicable; this power is in certain cases conveyed to the shackle pin, in an upward or downward direction, as the case may be, and is thence transmitted to one limb of the lever, the result being that the other limb, which acts as the guard closes or opens.

In the drawings herewith Figure 1 shows one form of my hook in side elevation, with its guard closed, as will be the case when the hook is in what may be described as its lower position relatively to the suspension member, that is a shackle pin or the like, part only of the latter being shown, in section.

Figure 2 shows the hook with its guard opened, part of the shackle pin or support being shown, in section, the hook body being in what may be described as its raised position relatively to the suspension member. Instead of referring to the hook body as raised or lowered, the shackle pin or the like may be regarded as lowered or raised relatively to the hook body.

Figure 3 is a front edge view showing the hook supported by a shackle and in tension by reason of a weight, its guard being, accordingly, closed.

Figure 4 shows, in perspective, one form of hook head, free from movable parts.

Figure 5 shows, in perspective, one form of lip or guard head.

Figure 6 shows, in perspective, one form of guard pivot pin.

Some of the details shown in the drawings are obviously modifiable without departing from claimed characteristics of the invention; thus if the guard is not to be unshippable the shackle pin could be made fast to the guard; and some other practicable variations are hereinafter indicated.

A shows a hook having a point or extremity B, a mouth C, and a head D which contains space for shackle pin movement, shown as an elongated slot H; and spaced, shown as a hole J, for the location of the body of a guard pivoting means; it also has in some cases abutment or protective surfaces against which part of the guard head may be located as in Figure 1. To provide these surfaces, K, there are lugs T on the hook head. The guard or lip has any suitable form of body and lower part, the latter being shown as an end F, adapted to engage the hook point, and for that purpose recessed at $F^1$; or the hook point could be recessed to receive the lip end.

In each case lateral displacement is prevented. The lip head is jointed to the hook head in any suitable manner, as by a tongue and groove joint, the lip head being shown with cheeks G bounding a channel L in which the hook head D fits.

The lip head contains means of shackle pin location, shown as a hole M in each cheek; it also contains means for pivoting the lip head to the hook head, these means being shown as a slot N in each cheek, for the reception of parts of a pivot pin or bolt. The slots N extend in the case illustrated from the hole M, and thereby allow of easily shipping or unshipping the pivot pin. The hole J and the slots N will thus receive a pivot member Q which allows the lip to be swung open or closed. The pin shown will hold the lip in working position without requiring riveting or fixing.

By reducing the cross sectional area of each end $Q^1$ of pin Q, as by providing flat surfaces thereon, these ends are enabled to slide into slots N which are narrower than the diameter of the pin body. Thus the pin, when in its working position, cannot escape therefrom.

The slot H receives loosely a suspending member, comprising a shackle pin R and bail R' and is of suitable length to allow of the shackle pin moving in the slot in correspondence with the swinging open or closing of the lip E. This slot is of arcuate or other suitable form, a suitable centre of the arc being the centre of the pivot pin Q. If the slot were not arcuate with a centre as described, but straight, for example, it would, in some cases, involve slide of the lip in the plane of slot N.

The laborer is not depended on to close the hook because when the suspending member—a chain, rope, or cable usually—begins to be raised, if the hook be open at first, it must close because the shackle pin will become raised as in Figure 1, and owing to the hook being loaded the shackle pin resists downward movement in slot H, and thus resists attempts to swing the guard lip open. The lip head and the hook head are assembled, in the case illustrated, by sliding head D into channel L until holes M register with hook hole J then inserting through those holes the pivot pin Q, then sliding the lip head on the hook head until hole M registers with slot H, then inserting the hook support or suspending member, shown as shackle pin R. Then the hook support is at proper times movable eccentrically to the guard pivot. I may, as a modification, use a rivet or bolt and nut instead of pin Q and may omit slots N connecting with holes M. No spring is necessary, nor will any be usual with my hook, but if spring means were introduced tending to hold or set any movable part into a predetermined position, as could be done, the features which I claim would still be employed.

When there is no load stress on the hook the guard lip E is easily swung open (by hand for example) to the position in Figure 2, carrying shackle pin R downward in slot H; or the hook body could be grasped by hand and raised to secure the same relative positions of the shackle pin and slot.

A useful way of causing the guard to open automatically, which can sometimes be adopted, is to lower the suspending member, as a chain, so as to deposit the load on a support, and then allow the said chain to descend slightly farther, thus causing the shackle to work into its lowered position as in Figure 2, the result being the said automatic opening.

For brevity, in one of the claims I term the apertures shown in the cheeks of Figure 5 keyholes. Furthermore throughout this specification the term hook is used broadly and is applicable to what are sometimes referred to as openable links.

I claim:—

1. As an article of manufacture, a safety hook having a curved member provided with a flanged end and a curved slot concentrically disposed with respect to an opening adjacent said end; an outwardly movable guard pivotally supported in said opening and having an opening to register with the curved slot and a straight radial slot from the opening to register at its end with the opening in the curved member, a pivot pin in the latter opening and having straight cutout ends to be embraced by the walls of said radial slot, and a shackle pin carried by the opening in the guard and adapted to project through the curved slot, the upper edge of said guard being disposed to abut the under edge of said flange when the T of the guard engages the free end of the curved member.

2. In a hook, the combination with a curved member having a flange on opposite sides to provide a stop, of an outwardly movable guard having one end provided with a yoke adapted to embrace said curved member, means for pivotally supporting the guard about the curved member, and means carried by the guard and movable about the pivotal means to limit the relative movement thereof with respect to the curved member.

3. A hook, as claimed in claim 2, in which said pivotal means comprises a pivot pin mounted in said curved member and embraced at its ends by the walls of the yoke, and in which the means for limiting the movement of the guard comprises a shackle pin carried by the guard and adapted to move through a curved slot in the curved member, substantially as described.

4. A hook, as claimed in claim 2, including a bail pivotally supported on the opposite ends of the means for limiting the movement of the guard, substantially as described.

In witness whereof I have hereunto set my hand.

JAMES ROBERTS.

Witness:
GEORGE G. TURRI.